United States Patent [19]

Sermon

[11] 4,143,120
[45] Mar. 6, 1979

[54] METHOD OF REMOVING NITRIC OXIDE FROM GASES

[75] Inventor: Paul A. Sermon, Cowley, England

[73] Assignee: Johnson, Matthey & Co., Limited, London, England

[21] Appl. No.: 758,335

[22] Filed: Jan. 10, 1977

Related U.S. Application Data

[63] Continuation-in-part of Ser. No. 553,312, Feb. 26, 1975, abandoned.

[30] Foreign Application Priority Data

Mar. 4, 1974 [GB] United Kingdom ............... 9684/74

[51] Int. Cl.² .......................................... B01D 53/34
[52] U.S. Cl. ............................ 423/239; 423/213.2; 423/213.5; 423/593; 423/644; 252/462; 252/463; 252/464; 252/465; 252/466 PT; 252/466 J; 252/467; 252/468; 252/472; 252/473; 252/474
[58] Field of Search ............... 423/210, 213.2, 213.5, 423/239, 644, 535, 593, 606

[56] References Cited

U.S. PATENT DOCUMENTS 3,752,776  8/1973  Chester et al. ............... 423/213.5

Primary Examiner—Earl C. Thomas
Attorney, Agent, or Firm—Cushman, Darby & Cushman

[57] ABSTRACT

This invention relates to a process for the purification of air and other gaseous media. The invention is particularly directed towards a process for the decomposition of one or more of the oxides of nitrogen present in a gas stream containing gaseous compositions such as carbon monoxide and hydrocarbon. In more detail the process of the invention includes the step of contacting said air or other gaseous media with a catalyst comprising a bronze selected from the group consisting of:

(a) compositions having the general formula $A_xBO_y$ where A is selected from the group consisting of the alkali metals, the alkaline earth metals, the rare earths, Ba, PB, Tl, Ni, Cu, $NH_4$, Ag and H; B is selected from the group consisting of Ti, V, Nb, Mo, Ta, W, Pt and Re, with x normally in the range $0 < 2 <$ and y normally lies between 2 and 3; and, (b) compositions having the general formula $C_xD_3O_4$ where C is selected from the group consisting of Na, Mg, Ni, Ca, Cd and Sr; D is Pd or Pt and x normally has values of $0 < x < 1$.

4 Claims, 3 Drawing Figures

METHOD OF REMOVING NITRIC OXIDE FROM GASES

This application is a continuation-in-part of my application Ser. No. 553,312 filed Feb. 26, 1975 and now abandoned.

This invention relates to a process for the purification of air and other gaseous media. More particularly it relates to a process for the decomposition of one or more of the oxides of nitrogen, which may be present in a gas stream also containing gaseous compounds such as carbon monoxide and hydrocrbons and which may also contain a stoichiometric excess of oxygen or an oxidation agent.

U.S. Pat. No. 3,454,355 discloses that noxious and offensive gases, such as sulphur dioxide and oxides of nitrogen, may be removed from flue gases also containing carbon monoxide by contacting the gases with a catalyst comprising pellets of an alumina support carrying a coating of copper, silver, nickel, molybdenum, palladium or cobalt. The metal may be present as a cation or it may be reduced to the metallic form.

U.S. Pat. No. 3,682,585 describes a method for removing a paramagnetic gas from a gas stream using, as catalyst, gamma-alumina carrying a coating of finely-dispersed copper optionally admixed with one or more activator metals Examples of suitable activator metals are silver, platinum, palladium, manganese, nickel, cobalt, chromium and molybdenum. The catalyst is prepared by pouring an aqueous solution of a copper salt and optionally an activator-metal salt over a quantity of gamma-alumina, drying and roasting the mixture to convert the metal salts to their oxides and finally reducing the oxides to metal form in a stream of hydrogen or a mixture of hydrogen and nitrogen.

In use, as the catalyst becomes deactivated due to oxidation, it may be reactivated by again reducing the reactant metal in a stream of hydrogen or hydrogen-nitrogen.

U.S. Pat. No. 3,864,451 relates to a method for removal of nitric oxide present in flue gases also containing sulphur dioxide, oxygen, carbon monoxide and so on. The flue gases are mixed with ammonia and the resulting mixture of gases is contacted with a catalyst comprising a platinum group metal, vanadium, molybdenum, nickel, copper, cobalt, or chromium, or oxides or mixtures thereof, preferably supported on a corrugated ceramic structure.

According to the present invention, a process for the purification of air and other gaseous media, for example, the decomposition of one or more oxides of nitrogen, includes the step of contacting said air or other gaseous media with a catalyst comprising a bronze selected from the group consisting of (a) compositions having the general formula $A_xBO_y$ where A is selected from the group consisting of the alkali metals, the rare earths, Ba, Pb, Tl, Cu, $NH_4$, Ag, Ni and H; B is selected from the group consisting of Pt, Ti, V, Nb, Mo, Ta, W and Re, with x normally in the range of $0 < x < 2$ (preferably x lies in the range $0 < x < 1$) and y normally lies between 2 and 3;

(b) composition having the general formula $C_xD_3O_4$ where C is selected from the group consisting of Na, Mg, Ni, Ca, Cd and Sr; D is Pd or Pt and x normally has values $0 < x < 1$.

The term "bronze" has come to be applied to a variety of non-stoichiometric crystalline phases of transition metal binary and ternary oxides. The bronzes according to types (a) and (b) above are preferbly ternary oxides, and since they are not stoichiometric compounds, the values of x and to a lesser extent, y, may vary considerably with elements A and C interstitial in the oxide lattice.

Examples of the composition of types (a) and (b) are:
(a) $Ba_{\frac{1}{4}}WO_3; Na_{\frac{1}{4}}WO_3; H_{0.5}WO_3; H_{1.6}MoO_{0.25}PtO_3$
(b) $Na_{0.25}Pd_3O_4; Ca_{0.25}Pd_3O_4; Ni_{0.25}Pt_3O_4$ The bronze may be used either in the supported or unsupported form. If it is supported, the support may be, for example, an inert unitary porous refractory ceramic honeycomb, although the support may equally be a ceramic material in the form of pellets, powder granules, monoliths, spherules, powder shaped extrudates or, for example, a corrugated or extended metallic substrate or nichrome wire.

Suitable materials which may be used to constitute a ceramic support are zircon-mullita, mullite, alumina, sillimanite, silica magnesium silicates, kaolin clays, zircon, petalite, spodumene, cordierite and most aluminosilicates.

Proprietary products which may be used for the supports are described in U.S. Pat. Nos. 3,397,154 and 3,498,927 and British Pat. No. 882,484. Examples of such products are "TORVEX", a mullite honeycomb having eight corrugations per inch and an alumina washcoat; "THERMACOMB" a cordierite honeycomb supplied by the American Lava Corporation and EX 20, a cordierite honeycomb supplied by Corning Glass.

Suitable corrugated or extended metallic substrates which may also be used as supports are such as those disclosed in German DOS 2450664.

One particular extended substrate is an oxidation resistant alloy of iron including at least one of the elements 3-40% by weight chromium, 1-10% by weight aluminum, a trace to 5% by weight cobalt, a trace to 72% by weight nickel and a trace to 0.5% by weight carbon. Another suitable extended metal substrate is a heat resisting alloy having an aggregate nickel plus chromium content greater than 20% by weight, the heat resisting alloy also exhibiting relatively high mechanical strength and thermal conductivity.

Dispersions of catalysts according to the process of the invention may be deposited upon supports by methods well known in the art. The support preferably has a first coating or layer, sometimes called a "washcoat", of an adherent coating containing oxygen, into which may be pumped a dispersion of the catalyst which may then be dried and calcined.

Preferably the first coating or layer upon the support is a high surface area, catalytically active refractory metal oxide film, 0.004 to 0.001 inch thick, containing, for example, one or more of alumina, silica, titania, zirconia, hafnia, thoria, beryllia, magnesia, chromia, or boria but may also comprise oxygen containing anions such as chromate, phosphate, silicate and nitrate.

An alternative metallic support may be made from an alloy such as that described in U.S. Pat. No. 3,298,826 and consisting of an aluminum bearing ferritic steel which forms a surface layer of alumina on heating in air.

Steels falling within the scope of U.S. Pat. No. 3,298,826 include those having a composition by weight of a trace to 15% chromium, 0.5-12% aluminium, 0.1 to 3% yttrium and balance iron, and are known by the Registered Trade Mark "Fecralloy".

Any of the well-known methods may be used to apply the washcoat to the support. For example, if a ceramic support is used and the washcoat comprises a high surface area catalytically active refractory metal oxide, the washcoat may be applied by dipping the support into an aqueous suspension, dispersion or slurry of the refractory oxide, followed by drying and calcining. On the other hand, if a metallic support is used, the method of applying the washcoat will depend on the ingredients of the alloy. For example, if aluminium is present a surface layer of alumina may be provided by oxidising with a solution of an alkaline carbonate, usually a sodium carbonate chromate solution. Alternatively, an alumina layer may be provided by making the metal the anode in an electrolyte of, for example, sulphuric acid. If aluminum is not present in the support, or if it is not present in a quantity sufficient to form an alumina layer on oxidation, an aluminium coating may be applied by vapour deposition followed by anodising or heating in an oxygen-containing gas. This is the process known by the Trade Mark "Calorising".

For a ceramic or a metallic support, a surface area of at least 600 sq. ft. per cubic ft. of washcoated support is preferred. A water porosity ranging from 15–40% is suitable with 25% preferred. At least 10% of the micropores should have a diameter greater than 10 microns and 90% greater than 10 microns is preferred.

The second layer comprising one or more of the bronzes as defined above is deposited upon the oxygen containing coating or film integral with the substrate and may be deposited in a form which possesses catalytic activity or which is capable of being rendered catalytically active by subsequent treatment. Catalytic structures according to this aspect of the present invention are extremely robust and effective in catalysing high temperature reactions such as the decomposition or reduction of nitric oxide.

The optimum quantity of bronze to be deposited on a support is that which gives 10 grams of metal B in type (a) compositions or 10 grams of metal D in type (b) compositions per cubic foot of support. Thus one catalytic structure comprises an inert unitary porous refractory ceramic honeycomb having a first or intermediate coating of a high surface area catalytically active refractory metal oxide and a second layer deposited upon the said first layer and comprising at least 10% by weight of a bronze as defined above.

The present invention also includes the catalyst described and used in the purification process described above.

The bronzes for use in the process of the present invention may be prepared by methods known in the art. Some examples of preparative methods are given below.

EXAMPLE 1 Preparation of $H_xWO_y(x<0.5; 2<y<3)$

Figure 1:
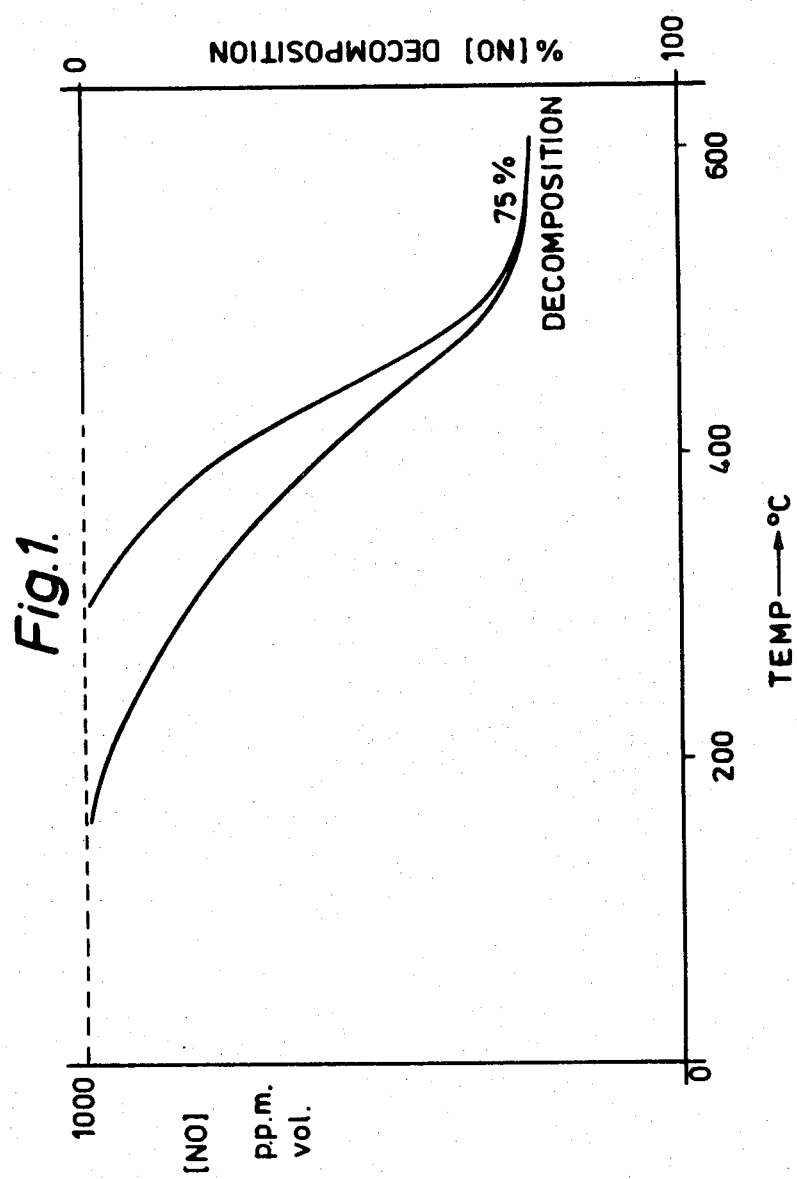
FIG. 1 is a graph showing nitric oxide decomposition utilizing a bronze comprising $H_{0.46}WO_{2.8}$ wherein the temperature is increased to 600° C. and then decreased.

Tungsten trioxide (purity >99.9%, obtained commercially from Koch Light Laboratories Ltd.) was calcined in air at 880° K. for several hours to eliminate any deficiency in oxygen. A sufficient volume of an aqueous solution of chloroplatinic acid ("Specpore" Registered Trade Mark; Johnson, Matthey & Co. Ltd.) to wet completely a given weight of the tungsten trioxide was evaporated to dryness on the oxide at 373° K. with constant stirring.

The product $H_2PtCl_6/WO_3$ (1.3 wt% Pt) was vacuum dried at ambient temperature.

A sample of $H_2PtCl_6/WO_3$ was flushed with pure hydrogen at atmospheric pressure at 195° K. Since no reaction occurs at this temperature, the system was thus purged of all oxygen and water. The temperature was then raised rapidly to 323° K. whilst maintaining the passage of hydrogen at atmospheric pressure and the colour of the $H_2PtCl_6WO_3$ changed immediately from yellow to dark blue due to the reduction of $H_2PtCl_6$ to metallic platinum and the subsequent "spillover" of atomic hydrogen to the trioxide support to form the bronze. The uptake in hydrogen at 323° K. was followed volumetrically and the final volume of sorbed hydrogen was converted to a value of x in the formula of the bronze $H_xWO_y$, assuming that the bronze is the sole product. The final volume of sorbed hydrogen was 19.1 $cm^3(STP)g^{-1}$ which corresponded to a value of x of 0.46 with an estimated uncertainty of ±0.01. The value of y is more difficult to determine since, as already mentioned, bronzes have variable stoichiometry and therefore it would be technically incorrect to attempt to ascribe a particular value between 2 and 3. However, it appears that a realistic figure for y is 2.8 and so the formula ascribed to this particular bronze is $H_{0.46}WO_{2.8}$.

EXAMPLE 2: Preparation of $H_{1.6}MoO_3$.

The procedure of Example 1 was followed using molybdenum trioxide instead of tungsten trioxide. The intermediate product was $H_2PtCl_6/MoO_3$ (1.6 wt % Pt).

On reduction at 323° K. and formation of the bronze by atomic hydrogenn "split over" from the platinum, the colour changed from pale grey to deep mauve. The final volume of sorbed hydrogen was 112 $cm^3(STP)_g^{-1}$ which gave a value for x of 1.63 ± 0.01.

A gravimetric measurement of sorbed hydrogen was also carried out and this gave a weight increase corresponding to a value for x of 1.6±0.1, which is in close agreement with the volumetric result given above.

EXAMPLE 3. Preparation of $Na_{0.9}WO_3$.

Reagent grade sodium tungstate dihydrate, dried at 110° C. and ground to a fine powder, tungsten metal (99.99% pure) approximately 300 mesh, and tungsten (VI) oxide, at least 99.9% pure, were weighted out and ground intimately to a fine powder. The weights taken were determined from the equation:

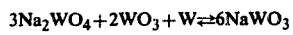

$$3Na_2WO_4 + 2WO_3 + W \rightleftharpoons 6NaWO_3$$

The mixture was placed in a pyrex or Vycon tube which was evacuated and flushed with argon to remove traces of oxygen and thereafter sealed in vacuo. The tube was headed for 500 hours at 675° C.

The bronze can be characterised by X-ray data. Precision lattice constants may be obtained either by the Straumanis technique or on a Philips X-ray diffractometer using a high purity silicon sample as internal standard. The lattice constant of the bronze prepared according to the method above indicates that the actual composition was $Na_{0.9}WO_3$, although the nominal composition according to the equation was $NaWO_3$.

Data for the catalysed decomposition of nitric oxide has been obtained for a number of unsupported bronzes having a relatively low surface area of exposure to the reacting gas and normally less than 2 sq. metres per gram.

Specifically, a bed depth of 1 cm. and a bed diameter of 0.6 cm. was used and the weight of bronze was taken as 0.3-0.5 g. A reactant gas at an input rate of 100 cm$^3$ min$^{-1}$ and composition 1000 ppm of NO in $N_2$ was used. The space velocity at 600° C was 33,000 hr$^{-1}$.

(a) $H_{0.46}WO_{2.8}$

Figure 2:
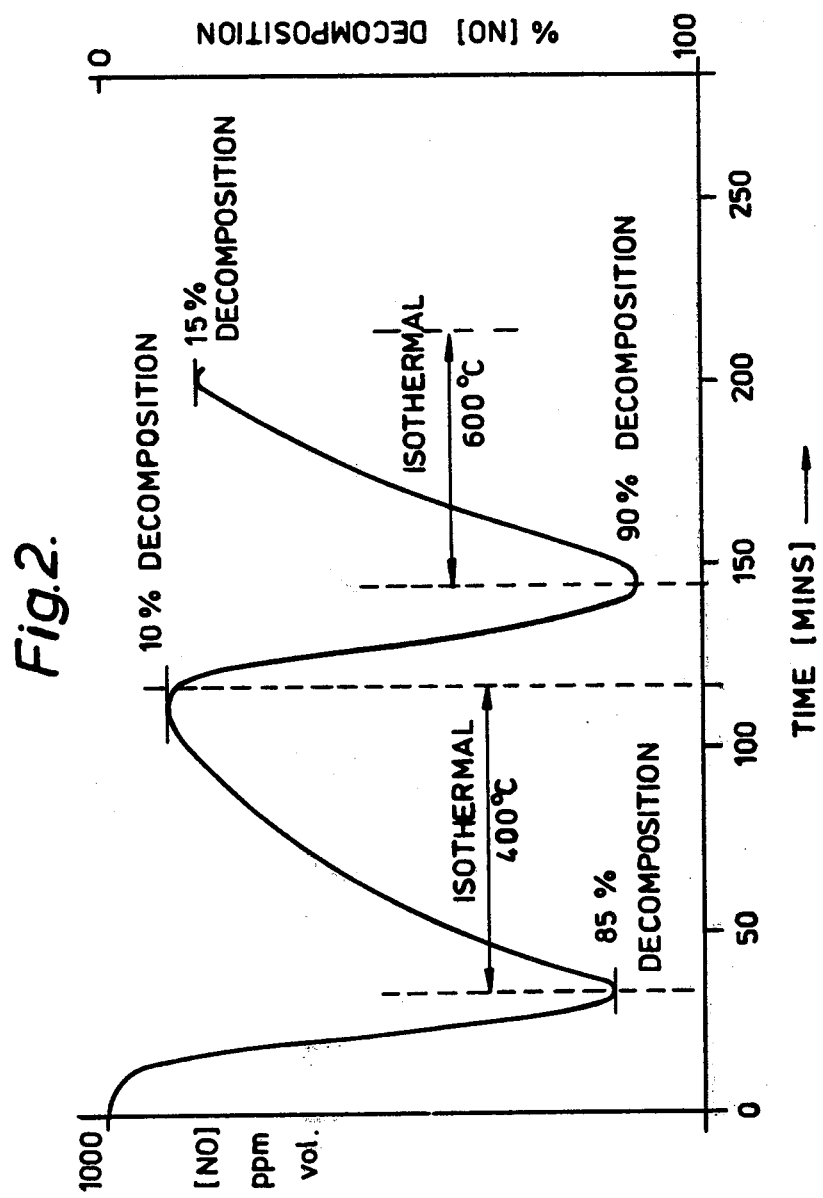
FIG. 2 is a graph showing nitric oxide decomposition utilizing a bronze comprising $H_{0.46}WO_{2.8}$ at the indicated constant temperatures.

Results for nitric oxide decomposition for this bronze are shown in FIGS. 1 and 2.

In FIG. 1 the temperature of the catalyst is increased to 600° C and then decreased at the rate of 10° min$^{-1}$ and in FIG. 2 the portions so marked are at constant temperature.

Differential thermal analysis and X-ray diffraction indicate that NO had oxidised the bronze in two ways, i.e.

$H_{0.46}WO_{2.8}$  NO  $WO_{2.8}$ NO  $WO_3$

It appears that NO oxidises the bronze at about the same temperature at $O_2$ (about 450° C.). $WO_3$ itself has no activity at temperatures up to 605° C, but it can be activated by $H_2$ to form the hydrogen bronze at 450° C.

The amount of hydrogen present in the bronze is not sufficient to sustain the reduction of NO to the extent observed. In order to ensure that the decomposition activity resided in the bronze and that oxidation of the bronze $H_xWO_3$ by nitric oxide resulted in loss of catalytic activity and was not responsible for the catalytic activity itself, further experiments were carried out, as in (b) below.

Figure 3:
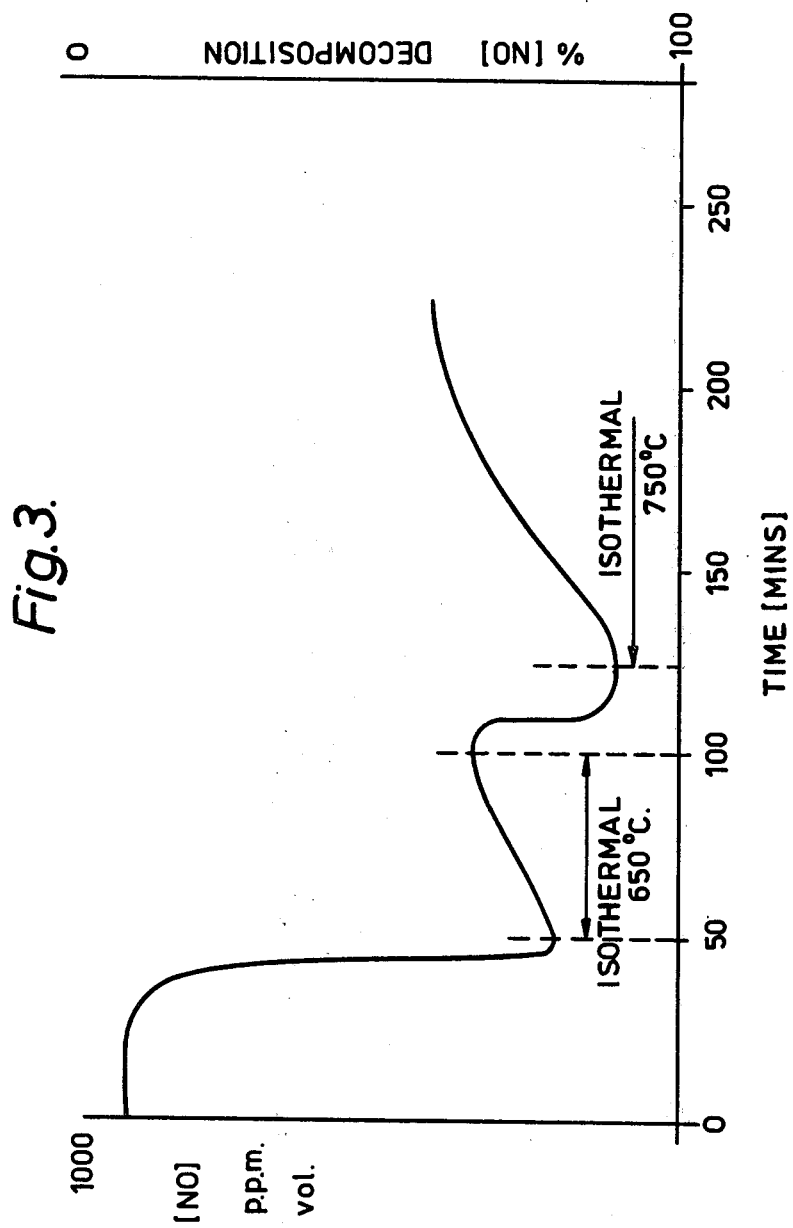
FIG. 3 is a graph showing nitric oxide decomposition utilizing a bronze comprising $Na_{0.9}WO_3$.

(b) $Na_{0.9}WO_3$ $Na_{0.9}WO_3$ is a bronze which could not readily be oxidised by NO. Results with this bronze are shown in FIG. 3.

The bronze was little affected by contact with nitric oxide.

80% decomposition for $Na_{0.9}WO_3$ is observed at a higher temperature than for $H_{0.46}WO_{2.8}$ (80% decomposition for $H_{0.46}WO_{2.8}$ is at about 450° C. ) However, this is almost certainly as a result of the lower surface area of the sodium form. It is clear that tungsten bronzes have reasonably good activity in NO decomposition at or above 450° C. Loss of activity is likely to be due to thermal sintering and, in the case of $H_{0.46}WO_{2.8}$, loss of bronze structure by the simultaneous oxidation by NO.

Although $H_{0.46}WO_{2.8}$ is more active than $Na_{0.9}WO_3$, it is also more susceptible to oxidation by NO and $O_2$ at about 450° C. A reducing environment is therefore more suitable for the hydrogen bronze.

(c) $H_{1.6}MoO_3$

The hydrogen in this is not so readily oxidised. However, at room temperature an initial NO decomposition of 100% is observed. This rate gradually decreases and after 150 minutes activity reaches a plateau at 30% decomposition. Raising the temperature to 100° C. makes the hydrogen in the bronze more active and the final activity is lower thus reflecting loss of some of the bronze structure. Considering the low surface area of the material it is exceptionally active at low temperature. It is also stable to oxygen at this temperature, therefore allowing its use in oxidising atmospheres, unlike the hydrogen tungsten bronze.

What is claimed is:

1. A process for removing NO from air or other gaseous medium which contains NO, said process comprising
    contacting said air or gaseous medium at a temperature of 450° C. or above with a mixture of platinum metal and a bronze of the formula $H_xWO_y$, wherein x is less than 0.5 and y is a value between 2 and 3.
2. A process according to claim 1, wherein y is 2.8.
3. A process according to claim 1, wherein x is 0.46.
4. A process according to claim 1, wherein said bronze comprises $H_{0.46}WO_{2.8}$.